United States Patent [19]

Muller

[11] Patent Number: 4,713,872

[45] Date of Patent: Dec. 22, 1987

[54] METHOD OF ATTACHING FASTENING ELEMENT TO A PANEL

[75] Inventor: Rudolph R. M. Muller, Frankfurt, Fed. Rep. of Germany

[73] Assignee: Multifastener Corporation, Detroit, Mich.

[21] Appl. No.: 852,689

[22] Filed: Apr. 16, 1986

Related U.S. Application Data

[60] Continuation-in-part of Ser. No. 773,387, Sep. 6, 1985, Pat. No. 4,633,560, which is a division of Ser. No. 563,833, Dec. 21, 1983, Pat. No. 4,555,838, which is a continuation-in-part of Ser. No. 458,099, Mar. 28, 1983, Pat. No. 4,459,073, and a continuation-in-part of Ser. No. 504,074, Jun. 14, 1983, Pat. No. 4,543,701, said Ser. No. 458,099 is a division of Ser. No. 229,274, abandoned, said Ser. No. 504,074 is a continuation of said Ser. No. 229,274.

[51] Int. Cl.$^4$ .................. B21D 39/00; B23P 11/00
[52] U.S. Cl. ........................ 29/512; 29/523; 29/243.52; 411/180
[58] Field of Search ............. 29/512, 523, 432, 432.2, 29/243.52; 411/180, 182, 183, 362, 360, 179

[56] References Cited

U.S. PATENT DOCUMENTS

| 2,005,087 | 6/1935 | Kamack | 29/512 X |
|---|---|---|---|
| 2,026,757 | 1/1936 | Swanstrom | 411/180 |
| 2,260,149 | 10/1941 | Meek | 29/512 X |
| 3,399,705 | 9/1968 | Breed et al. | 411/180 |
| 3,432,925 | 3/1969 | Woolley et al. | 29/512 X |
| 3,754,731 | 8/1973 | Mackal et al. | 29/512 X |
| 3,938,239 | 2/1976 | Lauth | 29/243.52 X |
| 4,018,257 | 4/1977 | Jack | 411/180 X |
| 4,430,034 | 2/1984 | Fujikawa | 29/432 X |
| 4,490,904 | 1/1985 | Moyher | 29/432 X |

Primary Examiner—Charlie T. Moon
Attorney, Agent, or Firm—Cullen, Sloman, Cantor, Grauer, Scott & Rutherford

[57] ABSTRACT

A riveting or self-fastening element such as a stud for permanent attachment to a panel preferably having a preformed panel opening, including the method of attachment and the panel assembly. The self-attaching element includes an annular barrel portion having a conical external surface which is press fitted in the panel opening to deform the panel opening and form a mating conical internal surface preventing further penetration of the fastening element into the panel. The free end of the barrel portion, which is preferably cylindrical, is simultaneously deformed outwardly in a die member having an annular die cavity, forming an annular rim which is U or hook-shaped in cross section, wherein the free end is biased against the panel preventing pull-out of the fastening element. The fastening element, method of attachment and panel assembly is particularly adapted for relatively thick metal panels, including panels having a thickness greater than 0.1 inches.

9 Claims, 7 Drawing Figures

METHOD OF ATTACHING FASTENING ELEMENT TO A PANEL

RELATED APPLICATIONS

This application is a continuation-in-part of my copending application Ser. No. 773,387, filed Sept. 6, 1985, now U.S. Pat. No. 4,633,560 which application was a division of Ser. No. 563,833, filed Dec. 21, 1983, now U.S. Pat. No. 4,555,838. This patent was filed as a continuation-in-part application of Ser. Nos. 458,099, filed Mar. 28, 1983, now U.S. Pat. No. 4,459,073 and Ser. No. 504,074, filed June 14, 1983, now U.S. Pat. No. 4,543,701. Such applications were, respectively, divisional and continuation applications of Ser. No. 229,274, filed Jan. 28, 1981, now abandoned, which claimed priority from an application filed Feb. 2, 1980 in the Federal Republic of Germany, No. 3003908.

FIELD OF THE INVENTION AND SUMMARY OF THE PRIOR ART

The present invention relates to an improved riveting or self-attaching element, such as a stud, bolt, nut or the like which is attached to a panel and which includes a riveting portion.

As disclosed more fully in my above-referenced related applications and patents, the prior art discloses various means of attaching an element to a panel. The fastening element of this invention is particularly adapted for attachement to a relatively thick panel having a preformed or prepierced panel opening. Various methods and fastening elements have been disclosed and described in the prior art for attachment to a panel or plate having a preformed opening, including U.S. Pat. No. 1,953,197 which discloses a method of attaching a ball element of a ball joint to an engine cylinder, U.S. Pat. No. 3,432,925, which discloses various methods of securing a rivet contact, U.S. Pat. No. 3,556,189, which discloses methods of attaching studs in a blind hole and U.S. Pat. No. 4,193,333, which discloses a clinch-type fastener and method of attaching a stud-type element to a relatively thick panel. Reference is also made to the prior art cited in my above-identified related applications and patents.

The disclosures of my above-identified related applications and patents were primarily concerned with fastening elements and method of attaching such elements to a metal panel such as used by the automotive industry for body panels, structural elements and the like having a thickness generally less than about 2.5 mm or 0.098 inches. In fact, an object of such fastening elements was to permit attachment to relatively thin panels, including panels having a thickness of about 0.031 inches, in a continuous operation, preferably including piercing the panel. The disclosed fastening elements and methods of installation are still preferred in most automotive applications, however, the need remains for a fastening element suitable for installation in relatively thick or heavy guage metal panels, including panels having a thickness ranging from about 0.06 to 0.3 inches or greater.

The prior art methods of attachment and self-fastening elements cited above are not suitable for many applications, particularly in relatively heavy guage panels used for automotive applications. Such automotive applications have minimum standards of push-through and pull-off, requiring joint integrity in both directions. Further, the fastener cost must be kept at a minimum and the method of installation must be relatively simple, permitting automation of the installation process. Because of these difficulties, stud or bolt-type fasteners are normally attached to relatively thick panels in automotive applications by welding. The method of attaching a weld stud or fastener generally does not permit very accurate location of the stud on the panel, welding methods require inspection of the weld joint, and weld methods on galvanized metals emit toxic vapors. Thus, welding method are not suitable for many automotive applications, particularly where the fastener must be very accurately located on the panel or the connection cannot be easily inspected.

The need therefore remains for a fastening element and method of attaching a fastening element to a relatively heavy guage panel, including panels having a thickness greater than about 0.1 inches. The fastening element and method of this invention solves the problems associated with the prior art in a manner which permits automation of the installation method and the fastening element and method are suitable for automotive applications.

SUMMARY OF THE INVENTION

The self-fastening or riveting element of this invention includes a body portion and an integral annular barrel portion having external and internal surfaces terminating in a free end. The external surface of the barrel portion includes a conical surface portion which is tapered outwardly from adjacent the free end. The barrel portion in the most preferred embodiment of the invention includes a cylindrical external surface adjacent the free end which guides the barrel portion into the panel opening or aperture and which is riveted or deformed in a die member to permanently attach the fastening element to the panel. In the preferred embodiment of the stud-type or male fastening element, the barrel portion is closed and a stud, bolt or other element extends integrally from the closed end of the barrel portion, preferably in coaxial alignment with the barrel portion.

As described, the method of attachment of this invention is particularly adapted for relatively thick panels, such as used by the automotive industry for structural elements, including brackets, frame elements and the like. The fastening element and method of this invention is particularly adapted for securement in a panel having a thickness greater than about 0.1 inches and the fastening element has been successfully installed in panels having a thickness of 0.315 inches and greater. It will be understood, however, that the fastening element and method of installation of this invention may also be used for thinner panels having a thickness of about 0.06 inches, for example. It is believed however, that the methods of installation and self-fastening elements disclosed in my above-identified related applications and patents will be more suitable for panel thicknesses less than about 0.1 inches.

The method of this invention includes forming a generally circular aperture through the panel having a cylindrical internal surface with a diameter generally about equal to the minor diameter of the conical surface on the barrel portion. That is, the diameter of the panel aperture should be generally equal to or slightly less than the minor diameter of the conical surface, which is the diameter of the cylindrical portion of the barrel in the preferred embodiment of the fastening element. The cylindrical external portion of the barrel guides the barrel portion into the panel aperture. The method next includes locating the fastening element barrel portion free end adjacent the panel with the annular barrel portion generally coaxially aligned with the panel aperture and a die member located on the opposite side of the panel. The die member includes an annular concave die cavity surrounding a central portion having an exterior diameter generally equal to the diameter of the internal barrel surface and coaxially aligned with the barrel portion.

The method next includes driving the barrel portion free end through the panel aperture, into the die cavity and the remaining steps are preferably performed in a continuous operation, nearly simultaneously. The conical surface of the barrel portion is driven against the cylindrical internal surface of the panel aperture, press fitting and reforming the internal surface of the panel aperture into a mating conical surface which resists further penetration of the barrel portion through the panel aperture. Simultaneously, the free end of the barrel portion is deformed radially outwardly in the die cavity and reversed against the panel, forming a radially outwardly extending annular rim, which is hook-shaped in cross-section, wherein the free end of the barrel portion is biased against the panel, spaced radially outwardly from the panel aperture. The hook-shaped end portion of the barrel thus prevents removal of the fastening element from the panel in the direction opposed to the direction of installation. The cone-shaped surfaces of the panel and barrel portion thus cooperate with the hook-shaped rim portion formed in the end of the barrel to prevent push-through or pull-out of the fastening element, which is thereby permanently attached to the panel.

In the most preferred method of this invention, the free cylindrical end portion of the barrel is entrapped in the die cavity and simultaneously thickened and deformed radially outwardly, forming an enlarged hook-shaped portion which is resiliently biased against the panel, forming a very secure installation. Because of the thickness of the panel, it is generally not possible to draw the panel into the die opening or deform a substantial portion of the panel into the annular rim formed in the barrel portion. In the preferred method, however, a small circular rim may be formed in the panel, which extends into the annular barrel portion rim adjacent the minor diameter of the panel aperture and which provides a mechanical interlock between the panel and the barrel portion.

The preferred embodiment of the self-attaching element includes an annular driving surface which extends generally perpendicular to the axis of the annular barrel portion for driving the barrel portion into the preformed panel opening. The internal surface of the barrel portion may be generally cylindrical, threaded or unthreaded, providing a simple and inexpensive construction. As will be understood, the resultant panel assembly includes mating press-fitted conical surfaces on the exterior of the barrel portion and the panel aperture which resist penetration of the barrel portion, and the barrel portion includes a U or hook-shaped annular rim having a free end portion which is preferably resiliently biased against the panel spaced from the panel aperture. In the disclosed embodiment, the barrel portion retained in the panel aperture is generally disk-shaped having an annular shoulder which is flush-mounted in the panel and which closes the end of the barrel portion.

The fastening element may also include a body portion which extends from the plane of the disk-shaped portion. The body portion may include or comprise a secondary fastening element, such as a stud, bolt, ball element or the like. Alternatively, the barrel portion may comprise a secondary fastening element, such as a nut fastener.

Other advantages and meritorious features of the fastening element, method of attachment and panel assembly of this invention will be more fully understood from the following description of the preferred embodiments, appended claims and the drawings, a brief description of which follows.

DESCRIPTION OF THE PREFERRED EMBODIMENTS AND METHOD

Figure 1:
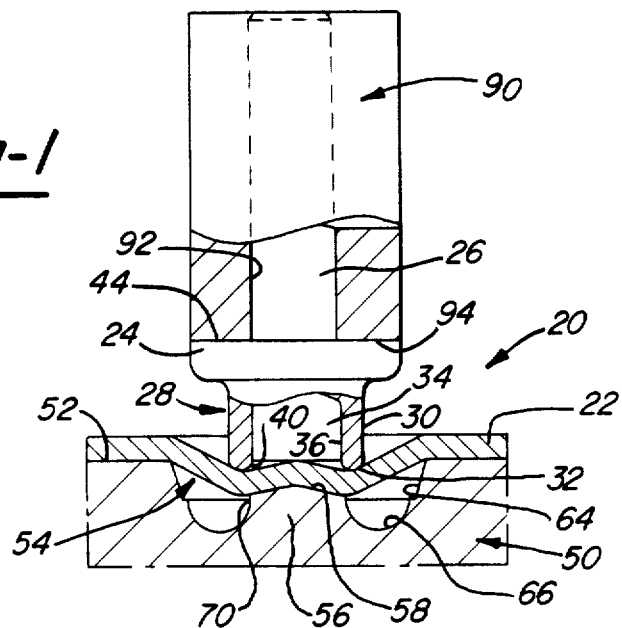
FIG. 1 is a partially cross sectioned side view of a self-attaching stud being installed in a panel and elements of the installation apparatus including a die member and plunger.
Figure 2:
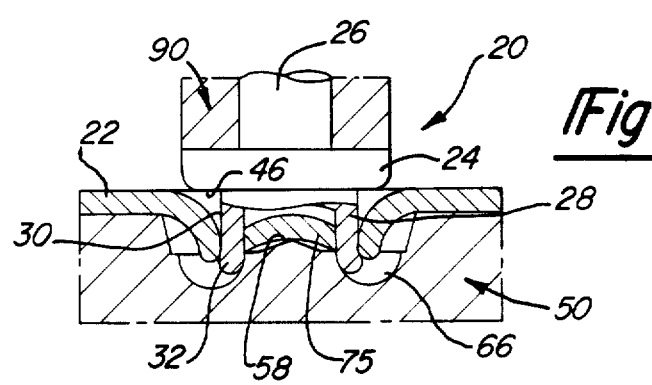
FIG. 2 illustrates the continuing sequence of installation of the stud member shown in FIG. 1.
Figure 3:
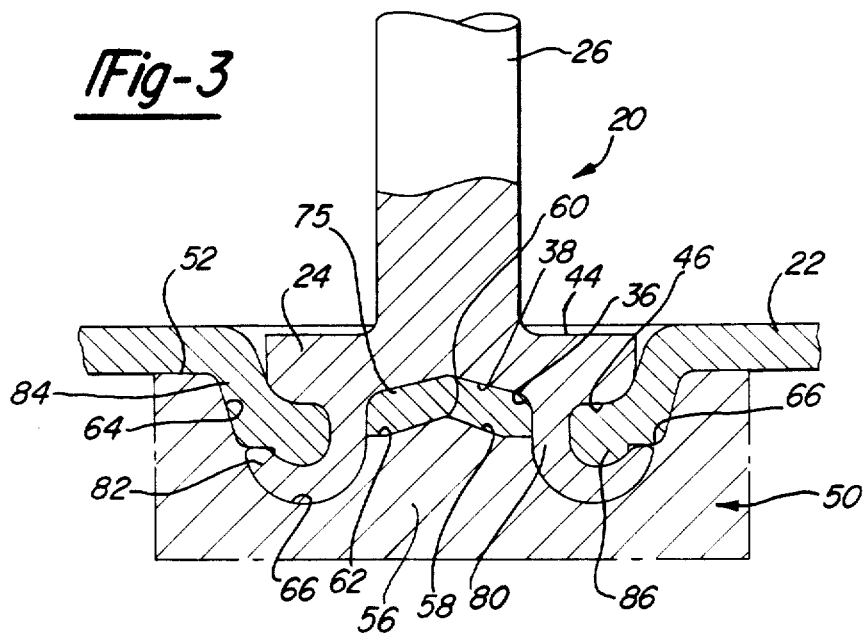
FIG. 3 illustrates the panel assembly formed by the stud member and method of installation of FIGS. 1 and 2.

The following detailed description of the preferred embodiments and method references copending U.S. patent application Ser. No. 773,387, filed Sept. 6, 1985 and U.S. Pat. No. 4,555,838, which issued from the parent application of the copending application. FIGS. 1 to 3 of this application are taken from the above-referenced copending application and patent and disclose the preferred embodiments of the self-piercing and riveting male-type fastener and method of installing the fastener in a "thin" panel. As described, this method is still preferred in panels having a thickness up to about 0.1 inches because the method does not require a preformed or prepierced panel aperture and the method may be performed in a single continuous operation, including piercing. Reference is also made to my copending application Ser. No. 657,570, filed Oct. 4, 1984, which was filed as a continuation-in-part application of Ser. No. 563,833, now U.S. Pat. No. 4,555,838. This copending application discloses alternative methods of installing female-type fasteners in a continous operation.

FIGS. 1 to 3 illustrate the preferred installation sequence and method of installing the stud-type fastener 20 in a relatively thin panel 22 as disclosed in the above-identified copending application Ser. No. 773,387, filed Sept. 6, 1985 and the parent application which issued as U.S. Pat. No. 4,555,838. The disclosed stud-type fastener includes a head portion 24 in the form of a radial flange, an unthreaded shank portion 26 and a self-piercing and riveting annular barrel portion 28. The outer or exterior surface 30 of the annular barrel portion in the disclosed embodiment is generally cylindrical and terminates in a rounded driving and drawing surface at the radially outer surface of the free end 32 of the barrel portion. The barrel portion includes a central recess or opening 34 which is defined by the cylindrical internal surface 36 and the bottom wall 38. The inner surface 36 of the barrel portion terminates in an annular piercing surface 40 adjacent the free end 32 of the barrel portion. The bottom wall 38 in the disclosed embodiment is conical and concave, as shown in FIG. 3.

The top surface 44 of the head portion 24 includes an annular driving surface adjacent the shank 26 and the bottom surface 46 of the head defines an annular bearing surface. It will be understood the "top" and "bottom" are relative terms depending upon the orientation of the fastener and are used herein only for descriptive purposes. The fastener of this invention may be attached with a die member or botton located either on the top or the bottom shoe or a die press, for example. Further, the annular barrel portion 28 may be of any annular configuration, including cylindrical, as shown, hexagonal, octagonal, etc. The disclosed embodiment, however, is relatively simple and provides excellent retention, as described below.

The installation method disclosed in FIGS. 1 to 3, begins with orienting the stud fastener 20 relative to the panel 22 and the die member 50. The die member includes a panel supporting or seating shoulder 52 which surrounds an annular die cavity 54. The annular die cavity 54 surrounds a central die portion 56 which includes a convex conical surface 58, preferably including a relatively sharp apex 60 and the conical surface surrounds an annular surface 62. The annular die cavity 54 includes an inclined or sloped outer surface 64 which blends into a panel supporting shoulder or lip 66 through a smooth arcuate surface. The bottom surface 68 of the annular die cavity is semi-toroidal and terminates in the annular shoulder or panel supporting lip 66.

As shown in FIG. 1, the panel 22 is first deformed into the annular die cavity 54. The panel is first engaged by the free end 32 of the annular barrel portion. The panel portion located inside the annular wall is then domed or trepanned against the conical surface 58 of the free end of the central projecting die portion 56, fixing this portion of the panel prior to piercing or shearing, as now described.

The panel is then pierced or sheared as shown in FIG. 2. The panel is sheared between the piercing surface 40 of the annular barrel portion and the piercing edge 70 located at the outer edge of the projecting central die portion 56, forming a panel slug 75 which is disposed within the fastener barrel portion recess 34 on the conical free end 58 of the projecting die portion. It will be understood that the configuration of the die member piercing edge 70 should be the same as the configuration of the annular wall 2B, such that the mating piercing surfaces pierce the panel. The piercing surface 40 of the barrel portion is preferably a chanfer face inclined outwardly from the axis of the annular barrel portion. The shearing of the panel then occurs along the shearing face 40, forming a panel slug 75 having an external diameter slightly greater than the internal diameter of the inner surface 38 of the annular wall, providing an interference fit. The inclined piercing face 40 is "self-correcting" and assures a clean shearing of the panel with a minimum of force.

FIG. 3 illustrates the final configuration of the stud-type fastener 20 and the panel assembly. The annular barrel portion 28 now includes a first tubular portion 80 and a second radially outwardly hook-shaped end portion 82, however, the barrel portion has generally the same thickness as the original configuration. The slug 75, which was pierced from the main portion of the panel 22, has been deformed against the bottom wall surface 38 of the barrel portion recess by the conical free end 58 of the central projecting die portion 56. The panel slug becomes an integral part of the fastener and panel assembly. The panel 22 now includes a main portion 22 bearing against the panel supporting shoulder 52 of the die button, a second portion 84 drawn and displaced form the plane of the main panel portion and conforming to the inclined outer wall 64 of the die cavity and the annular lip 66, which has limited the deformation of the panel into the die cavity and which supported the panel during the final deformation of the panel in the hook-shaped end portion 82 of the barrel portion. During the final installation, the panel portion surrounding the pierced panel edge is driven into the developing hook-shaped channel 82 of the barrel portion, thickening the panel portion as shown at 86. As disclosed more fully in the above-identified copending application, the installation apparatus includes an installation head (not shown) which receives the stud fasteners and which includes a reciprocal plunger 90 having a bore 92 which receives the shank portion 26 of the fastener and an annular driving surface 94 which bears against the annular driving surface 44 of the fastener and which drives the barrel portion 28 of the fastener into the panel, as described above.

Having described one embodiment of a self-piercing and riveting stud-type fastener and the method of installation, it will be understood that there is a practical limit to the thickness of the panel 22 to which the self-piercing and riveting fastener 20 may be attached. First, the barrel portion 28 must pierce the panel 22, limiting the thickness of the panel. Further, the panel is drawn into the die opening, as shown in FIGS. 1 and 2, and the panel is then driven into the developing hook-shaped end portion 82, forming a thickened end portion 86, which is entrapped within the hook-shaped barrel portion. Of course, the thickness of the panel to which the fastener may be attached will also be dependent upon the size and thickness of the barrel portion. The size of the barrel portion is, however, determined in practical application by the size of the bolt. Thus, an alternative design and method of installation is necessary to accommodate relatively thick panels for conventional bolt sizes, as described above.

FIGS. 4 to 7 illustrate an alternative embodiment of the self-fastening element of this invention particularly adapted for attachment to a relatively thick panel or a panel having a substantial thickness, i.e., greater than about 0.1 inches and including thicknesses greater than 0.3 inches. An M8 stud (stud having a thread crest diameter of 8 mm) of the type disclosed, for example, is suitable for attachment to a panel having a thickness of 6 mm and an M12 stud can accommodate an 8 mm panel. Again, the illustrated self-fastening element is a stud-type fastener having a body portion 102 in the form of a male threaded bolt, and an annular barrel portion 104. The barrel portion in the disclosed embodiment includes a generally cylindrical internal surface 106 and an external surface including a cylindrical end surface portion 108 and a conical surface portion 110. The barrel portion includes a free end 112, which in the disclosed and preferred embodiment is a convex arcuate surface which joins the internal and external surfaces of the barrel portion. The barrel portion defines an internal cavity 114 which is enclosed by bottom wall 116. In the disclosed embodiment, the bottom wall 118 also defines a disk-shaped body portion having a conical outer surface 110 and a top driving surface 118.

Figure 4:
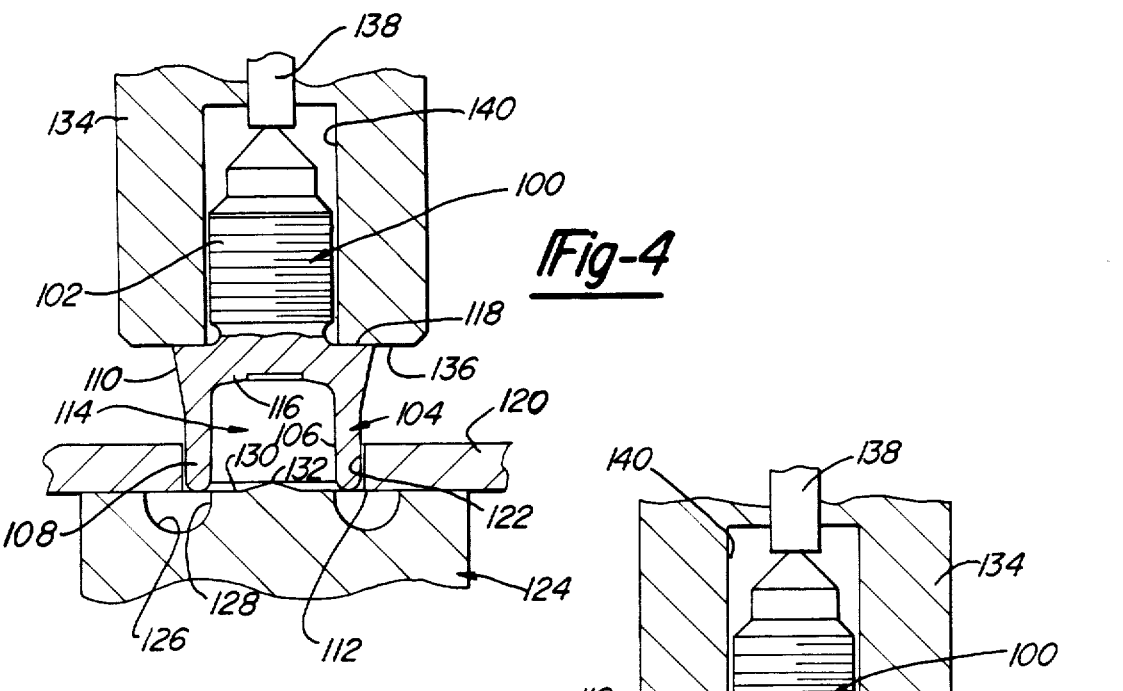
FIG. 4 is a partially cross sectioned side view of an embodiment of the self-attaching element of this invention, suitable for installation in relatively thick panels, and elements of the installation apparatus.

As described above, the panel 120 may be relatively thick and the panel preferably includes a preformed or prepierced cylindrical aperture 122. As shown, the diameter of the aperture 122 is generally equal to the minor diameter of the cone-shaped surface 110, which is the diameter of the cylindrical surface 108. The cylindrical annular end portion of the barrel portion guides the barrel portion into the cylindrical panel aperture 122, as shown in FIG. 4. As will be understood, the barrel portion 104 is aligned with the panel aperture, and a die member 124 is located on the opposite side of the panel. The die member includes an annular concave die cavity 126 having an internal surface 128 which closely receives the internal surface 106 of the barrel portion. The concave die cavity is semi-toroidal, but the die cavity does not include a panel receiving lip, as described above in regard to FIGS. 1 to 3, because the panel is not deformed into the die cavity. The die member does include a central die portion 130, which is the disclosed embodiment includes a conical end portion 132.

As disclosed more fully in the above-identified copending application and U.S. Pat. No. 4,555,838, the installation apparatus includes a plunger 134 having an annular surface 136 which drives the fastener into the panel. The disclosed embodiment also includes a gage pin 138 which indicates the presence of a fastening element in the bore 140 of the plunger, ready for installation. As described in the copending application, the fastening elements are serially received in the installation head and located in the plunger ready for installation.

Figure 5:
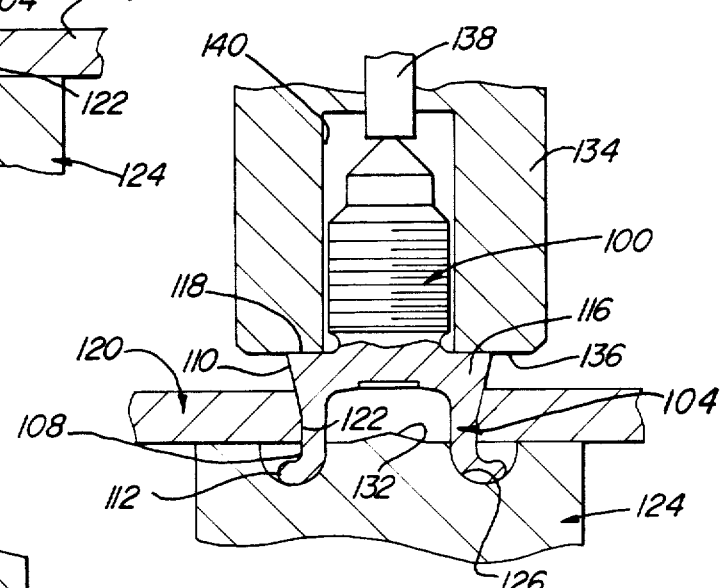
FIG. 5 is similar to FIG. 4 except that the self-fastening element has been partially installed in the panel.
Figure 6:
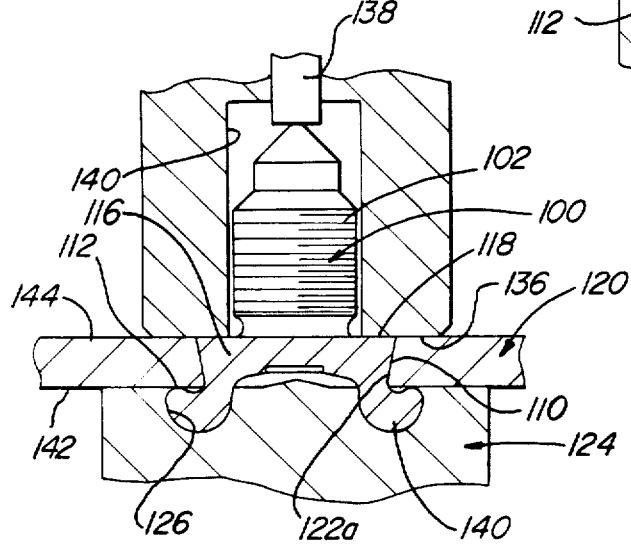
FIG. 6 is a side partially cross-sectioned view of the assembly shown in FIGS. 4 and 5 following installation of the self-fastening element.
Figure 7:
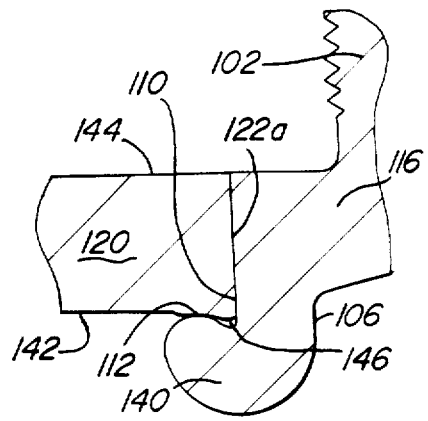
FIG. 7 is an enlarged partial view of FIG. 6.

FIGS. 4 to 7 illustrate the method of installation and installation sequence of this invention. First, as described, the barrel portion 104 of the fastening element is located adjacent the panel with the barrel portion coaxially aligned with the panel aperture and the die member, as shown in FIG. 4. The free end 112 of the barrel portion 104 is then driven through the panel aperture 122 into the die cavity 126 by the plunger 134 as shown in FIG. 5. The conical external surface 110 of the barrel portion is press fitted into the cylindrical aperture 122 in the panel, deforming the internal cylindrical surface of the aperture and forming a mating conical surface. The free end 112 of the barrel portion is simultaneously deformed radially outwardly against the semitoroidal concave die cavity surface 126. As best shown in FIG. 6, the cylindrical end portion of the barrel portion is deformed in the annular die cavity to substantially fill the annular die cavity and entrapped therein to form a thickened annular channel 140 which is hook-shaped in cross section and wherein the free end 112 of the portion is resiliently biased against the bottom surface 142 of the panel, spaced radially from the panel aperture 122. As shown in FIG. 6 and 7, the cylindrical surface of the panel aperture has been deformed into a conical surface 122a, which fully mates with the conical surface 110 of the barrel portion, limiting further penetration of the barrel portion into the panel opening. Further, the annular driving surface 118 is driven flush with the top surface 144 of the panel, such that the threaded bolt portion 102 extends from the plane of the panel 144.

As best shown in FIG. 7, the edge of the panel 120 adjacent the panel opening 122a is deformed slightly to improve the retention of the fastening element to the panel. A small circular lip 146 is formed into the annular channel or hook-shaped portion 140, providing a mechanical interlock between the barrel portion and the panel. The mating conical surfaces 110 and 122a thus prevent "push-through" of the fastening element through the panel opening in the direction of the installation of the fastening element. The enlarged hook-shaped annular channel 140, including the free end 112 which is resiliently biased against the bottom face 142 of the panel, prevents "pull-out" in the opposite direction. The panel assembly is therefore quite secure, particularly in a panel of substantial thickness, as described above.

As will be understood, the configuration of the fastening element 100 may be modified as required by the application. Thus, the male threaded shank 102 may be replaced with an unthreaded shank, a ball member for a ball and socket joint, a hinge member or removed entirely to form a female element, such as a nut fastener, in which case the internal surface 106 may be internally threaded. Other modifications may be made to the fastening element, method of installation and panel assembly of this invention within the purview of the appended claims.

I claim:

1. A method of permanently attaching a metal element to a plastically deformable metal panel having a predetermined substantial thickness greater than 0.1 inches, said element having an annular barrel portion with a thickened driving end surface, said barrel portion including external and internal surfaces terminating in an opposite free end, said barrel portion external surface including a conical annular surface portion tapered outwardly from adjacent said free end to said driving end surface, said method comprising the following steps:

(a) forming a generally circular aperture through said panel having a generally cylindrical internal surface having a diameter generally equal to the minor diameter of said exterior conical surface of said barrel portion;

(b) locating said element barrel portion free end adjacent said panel with said annular barrel portion generally coaxially aligned with said panel aperture and a die member located on the opposite side of said panel, said die member having a concave generally annular die cavity including an inner surface generally conforming to and coaxially aligned with said internal barrel surface and a panel supporting surface on at least opposite sides of said die cavity supporting said panel;

(c) driving said barrel portion free end through said panel aperture, into said die cavity, and performing the following steps in a continuous operation;

(d) driving said barrel portion conical external surface against said panel aperture generally cylindrical internal surface, plastically deforming said panel aperture internal surface to generally conform to said conical barrel surface, said conical surfaces resisting further penetration of said barrel portion through said panel aperture; and (e) while plastically deforming said barrel portion free end radially outwardly in said die cavity, forming a radially outwardly extending hook-shaped end portion, with said barrel portion free end engaging said panel, said hook-shaped end portion resisting pull-out of said barrel portion from said panel aperture.

2. The method of attaching an element to a panel defined in claim 1, including simultaneously thickening and plastically deforming said barrel portion free end, forming said enlarged hook-shaped end portion, engaging said panel spaced radially from said panel aperture.

3. The method of permanently attaching an element to a panel as defined in claim 1, wherein said barrel portion conical external surface is spaced from said free end by a generally cylindrical external surface having a diameter generally equal to said panel aperture, said barrel portion external surface guiding said barrel portion into said panel aperture, and said method including deforming said cylindrical portion radially outwardly, forming said radially outwardly extending hook-shaped end portion.

4. The method of permanently attaching an element to a panel as defined in claim 3, wherein said method includes simultaneously thickening and deforming said cylindrical barrel end portion radially outwardly, forming an enlarged hook-shaped end portion engaging said panel, spaced radially from said panel aperture.

5. The method of permanently attaching an element to a panel as defined in claim 1, wherein said panel is supported on a surface surrounding said die cavity during installation of said element, said panel being generally planar adjacent said aperture and remaining generally planar during said installation.

6. The method of permanently attaching an element to a panel as defined in claim 5, wherein said method includes deforming a small circular panel portion at the periphery of said aperture extending into said hook-shaped barrel end portion, mechanically interlocking said panel portion and said barrel portion.

7. A method of permanently attaching a metal element to a metal panel, said panel having a predetermined substantial thickness greater than 0.1 inches and a generally circular aperture through said panel having a generally cylindrical internal surface, said element having an annular barrel portion closed at a driving end, said barrel portion including internal and external surfaces terminating in an opposite free end, said barrel portion external surface including a conical surface portion tapered outwardly from adjacent said free end to said driving end surface, and having a minor diameter generally equal to the internal diameter of said panel aperture, said method comprising the following steps performed in a generally continuos sequence.

(a) locating said element barrel portion free end adjacent said panel with said annular barrel portion generally coaxially aligned with said panel aperture and a die member located on the opposite side of said panel, said die member including a concave annular die cavity having an inner surface generally conforming to and coaxially aligned with said internal barrel portion and a panel supporting surface on at least opposed sides of said die cavity supporting said panel;

(b) driving said barrel portion free end through said panel aperture, into said die cavity, said barrel portion conical external surface plastically deforming said panel aperture cylindrical surface to generally conform to and mate with said conical barrel surface, said mating conical surfaces resisting further penetration of said barrel portion through said panel aperture; and (c) while plastically deforming said barrel portion free end radially outwardly in said die cavity, entrapping and thickening said barrel portion and turning said barrel portion free end to engage said panel spaced from said aperture, forming an enlarged annular rim end portion on said barrel portion being hook-shaped in cross section and preventing pull-out of said element from said panel aperture.

8. The method of permanently attaching an element to a panel as defined in claim 7, wherein said barrel portion conical external surface is spaced from said barrel portion free end by a generally cylindrical external surface having a diameter generally equal to said panel aperture, said barrel portion external cylindrical surface guiding said barrel portion into said panel aperture and said method including deforming said cylindrical portion radially outwardly forming said enlarged annular rim.

9. The method of permanently attaching an element to a panel as defined in claim 7, wherein said panel is generally planar adjacent said aperture prior to installation and said method includes deforming a small circular panel portion at the periphery of said aperture extending into said barrel portion annular rim opening forming a mechanical interlock between said barrel portion and said panel.

* * * * *

UNITED STATES PATENT AND TRADEMARK OFFICE
CERTIFICATE OF CORRECTION

PATENT NO. : 4,713,872

DATED : December 22, 1987

INVENTOR(S) : Rudolph R.M. Muller

It is certified that error appears in the above-identified patent and that said Letters Patent is hereby corrected as shown below:

Claim 7, line 6, delete "closed at a driving end" and insert -- with a thickened driving end surface -- ;

Line 9, before "surface" (second occurrence), insert -- annular --;

Line 14, delete "continuos" and substitute therefor -- continuous --.

Signed and Sealed this

Seventh Day of June, 1988

Attest:

DONALD J. QUIGG

*Attesting Officer*   *Commissioner of Patents and Trademarks*